United States Patent [19]

Huang

[11] Patent Number: 4,731,899

[45] Date of Patent: Mar. 22, 1988

[54] ROTARY ROLLER SET DIRECTIONAL CONTROL DEVICE

[76] Inventor: Yung-Ho Huang, 140-58, Ch'e-Lu-Chien, Pao An Ts'un, Jen Te Hsiang, Tainan Hsien, Taiwan

[21] Appl. No.: 887,063

[22] Filed: Jul. 18, 1986

[51] Int. Cl.⁴ ............................................. B60 B33/02
[52] U.S. Cl. ....................................... 16/35 R; 16/44; 16/344
[58] Field of Search .......................... 16/35 R, 44, 344

[56] References Cited

U.S. PATENT DOCUMENTS 4,483,042  11/1984  Dieter .................................. 16/35 R
4,575,896  3/1986  Nakao et al. ....................... 16/44 X
4,608,729  9/1986  Huang ..................................... 16/44

FOREIGN PATENT DOCUMENTS 141986  3/1881  France .................................... 16/44

Primary Examiner—Fred Silverberg
Attorney, Agent, or Firm—Cushman, Darby & Cushman

[57] ABSTRACT

The present invention is related to a rotary roller set directional control device, particularly to a rotary roller set device, which is characterized by a novel design wherein two opposite longitudinal positioning slots are positioned at the upper section of a pivotal shaft socket, a pivotal supporting arm with a U-shaped rocker of which the front end is provided with a suitable catch key extended downward. The rocker may swing downward to assemble with the upper section of pivotal shaft socket and insert the catch key in the positioning slot. An annular flange on the top edge of pivotal shaft socket is designed to decrease the contact area between the pivotal supporting arm and the pivotal shaft socket when rotating the pivotal supporting arm to change the catch direction of U-shaped rocker so as to lower the frictional resistance. A positioning column and an elastic element are in a long shaft hole on the rear end of a roller seat for controlling the pivotal shaft socket to make its direction stable and to make the change of its direction easy as well as to make it shock-proof effective.

3 Claims, 6 Drawing Figures

FIG.2-A

ROTARY ROLLER SET DIRECTIONAL CONTROL DEVICE

BACKGROUND OF THE INVENTION

The present invention is particularly related to a rotary roller set directional control device suitable for directional roller displacement of a rotary roller set at the bottom of portable handcart such as the baby carriage and shopping cart. An annular flange is on the top edge of a pivotal shaft socket to lower its frictional resistance, and an elastic element and a positioning column are in a long shaft hole on the rear end of roller seat. The positioning column moves therein and through the buffer force of the elastic element maintains the smooth and stable movement forward of the handcart. This controls the pivotal shaft socket making its direction stable and to making its directional change easy as well as making shockproof.

The conventional baby carriage, shopping cart or portable handcart is provided with a plurality of roller sets at its bottom which may be fixed or rotary. The fixed set can move or roll in a certain direction, and the rotary one set can move in any chosen direction for 360° in line with the rotary shaft of roller set. Namely, when pushing the handcart, one has only to apply a force to the handcart in the desirable direction, and the rotary roller set can rotate and roll forward accordingly.

This conventional rotary roller set can roll in any direction, but its direction has to be fixed if directional movement, is necessary so a directional device is provided to the rotary roller set as a rule. So far as the conventional directional device is concerned, an annular member is inserted in the pivotal shaft socket thru the pivotal supporting arm of rotary roller set. Since there is a considerable gap between the annular member and the pivotal shaft socket, the rotary roller set is susbject to resistance when rolling and moving the roller will then slip out of its position, and the roller set will move in an undesirable direction. This drawback is always found in the front wheels of baby carriage. However, if the pivotal supporting arm is in tight contact with the pivotal shaft socket, since the contact area is large it generates a high frictional coefficient and it is difficult to rotate the pivotal shaft socket for movement when rotating the U-shaped rocker of rotary roller set for directional regulation. In the circumstances, the said frictional resistance has to be lowered so as to enhance the rotary efficiency thereof. However, no buffer mechanism is provided to the rotary roller set, in case of moving on a rough road, the handcart per se will drastically jolt. If the baby carriage moves thereon, the baby will never be able to peacefully fall asleep in the carriage or might get be hurt from collision with the carriage per se. So the prohibitive jolt and shock of rotary roller set in the course of moving on a rough road should be improved.

Under the effect of artifical factors of poor design of conventional rotary roller set directional control device, the prohibitive drawback the handcart cannot achieve the purpose of safety and comfort. Therefore, an improved rotary roller set directional control device has to be developed.

SUMMARY OF THE INVENTION

In view of the drawback of impossible stable and strict orientation of conventional rotary roller set directional control device, this inventor, based on his experiences in manufacturing such a rotary roller set for a number of years, and through wholehearted, positive and continued brainstorm, research and development, has eventually invented a directional device for correct control over the rotary roller set, namely, it is the inventive rotary roller set directional control device.

The primary object of this invention is to offer a rotary roller set directional control device with dual stability and strict control over the rotary roller for directional rolling.

The secondary object of this invention is to offer a rotary roller set directional control device which is characterized by two opposite longitudinal positioning slots at the upper section of lower part of pivotal shaft socket and a U-shaped rocker on the pivotal supporting arm of upper part thereof. A catch key is located on the rocker which can be assembled with the upper section of pivotal shaft socket and inserted in the positioning slot through swinging down by the pivotal supporting arm.

Another object of this invention is to offer a rotary roller set directional control device which is characterized by an annular flange on the top edge of pivotal shaft socket to decrease the contact area between the pivotal supporting arm and the pivotal shaft socket and thereby lower the frictional resistance therebetween when regulating the direction of catch key on the U-shaped rocker.

Still another object of this invention is to offer a rotary roller set directional control device which is characterized by an elastic element and a positioning column in the long shaft hole at the rear end of roller seat to move the positioning column up and down therein through the buffer force of elastic element so as to keep the smooth and stable movement forward of the handcart.

DESCRIPTION OF DRAWINGS

FIG. 2A is an optional sectional view of assembly of this invention.

Figure 1:
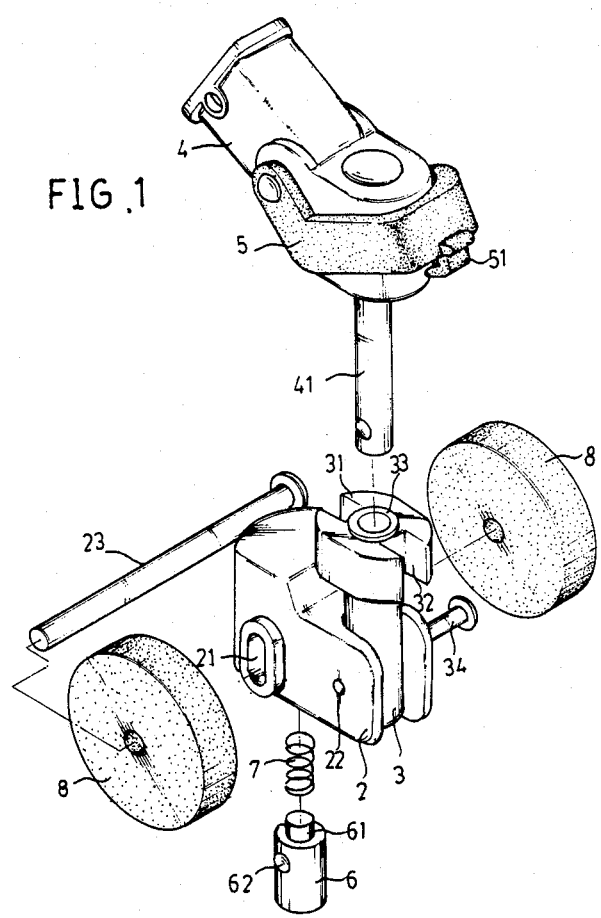
FIG. 1 is an elevational breakdown view of this invention.

Cross-reference numbers:
1 . . . rotary roller set device   2 . . . roller seat
21 . . . oval shaft hole   22 . . . front assembly hole
23 . . . rear shaft bolt   3 . . . pivotal shaft socket
31 . . . projection   32 . . . positioning slot
33 . . . annular flange   34 . . . front shaft bolt
4 . . . pivotal supporting arm   41 . . . revolving shaft
5 . . . U-shaped rocker   51 . . . catch key
6 . . . positioning column   61 . . . clip shaft column
62 . . . assembly hole   7 . . . spring
8 . . . roller

DETAILED DESCRIPTION

The objects, technical means, structure, characteristics, contents and functions of this invention can be best described in conjunction with the accompanying drawings.

Figure 2:
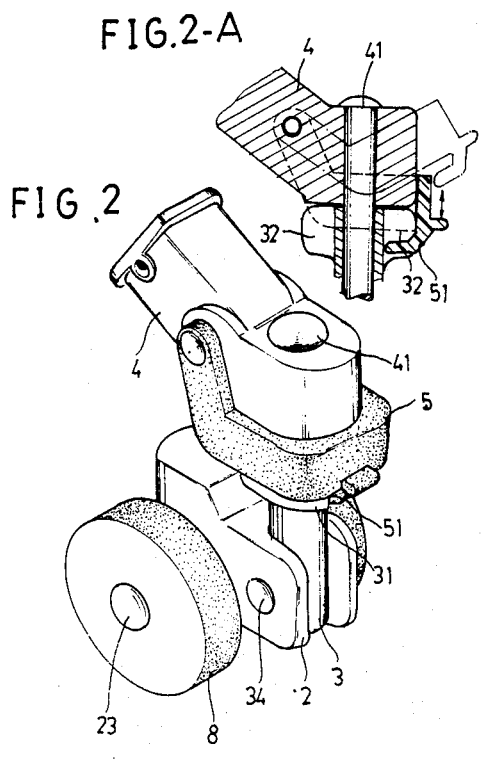
FIG. 2 is an elevational assembly view of this invention.
Figure 5:
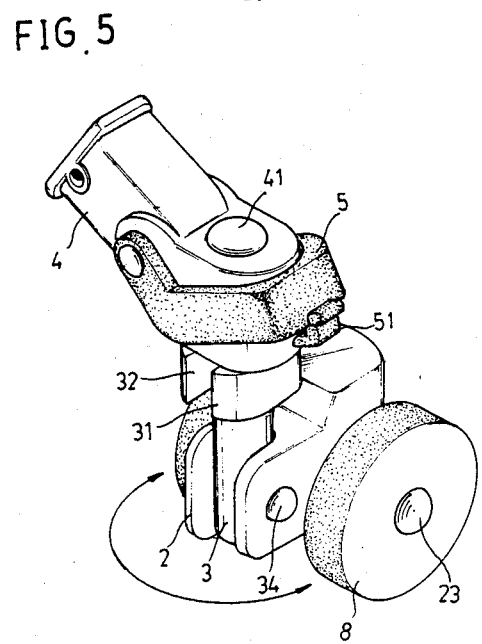
FIG. 5 is an optional view of operation of this invention.

As shown in FIGS. 1 and 2, the rotary roller set directional control device of this invention is installed on the roller seat as shown in FIG. 2. The rotary roller set consists of a roller seat 2 whereon an oval shaft hole 21 is at the rear end. A rear shaft bolt 23 movably locks two rollers 8. A U-shaped slot is provided with a assembly hole 22 on the two opposite wide walls at its front end, so that a front shaft bolt 34 can lock the pivotal shaft socket 3 and the revolving shaft 41 of a pivotal supporting arm 4. A T-shaped pivotal shaft socket 3 whereon a shaft-shaped body is at the lower end is provided with a projection 31 on the top. Two opposite positioning slots 32 are on the projection 31 and a shaft hole is located in the center of annular flange 33 so that a revolving shaft 41 can be inserted in the shaft hole at the front end of pivotal supporting arm 4 to make the bottom edge of pivotal supporting arm 4 contact with the projection 31, and that the roller seat 2 and pivotal shaft socket 3 can rotate with the revolving shaft 41 as the center. A pivotal supporting arm 4 of which the upper section is locked near the bottom of the handcart is provided. A U-shaped rocket 5 whereon an inward catch key 51 on the lower edge of front end can be inserted in the positioning slot 32 on the pivotal shaft socket 3 so as to fix the lower section of the roller set for orientation. A sectional view of the assembly of this invention is shown in FIG. 2A.

Figure 3:
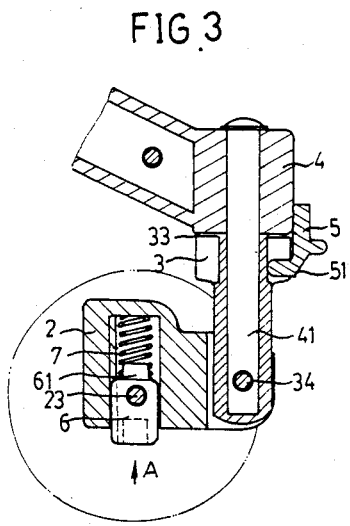
FIG. 3 is a section view of this invention.
Figure 4:
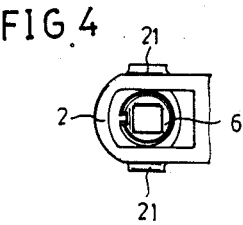
FIG. 4 is a bottom view of rear end of roller seat of this invention.

As shown in FIGS. 3 and 4, the revolving shaft 41 is inserted in the shaft hole at the center of annular flange 33 at the top edge of pivotal shaft socket 3 so that the annular flange 33 is in close contact with the bottom edge of pivotal supporting arm 4. The area of contact between the pivotal shaft socket 3 and the pivotal supporting arm 4 is limited to the diametrical width of annular flange 33 and is smaller than in a conventional device. When adjusting the direction of catch key 51 on the U-shaped rocker 5, the revolving frictional resistance therebetween is much smaller as a matter of course. A spring 7 and a positioning column 6 are placed in a hollow column at the rear end of roller seat 2 and fixed by a rear shaft bolt 23. Since the diameter of oval shaft hole 21 is larger than that of rear shaft bolt 23, the positioning column 6 subject to a force which can actuate the rear shaft bolt 23 to move in the oval shaft hole 21, so that the elastic buffer force of spring 7 can absorb the vibrating force, lower the extent of impact of collision and shock and enhance the smooth, stable and comfortable movement forward of rotary roller set during collision and and jolt.

In view of the above, this invention has the special structure of dual catch to eliminate the drawback of slipping off of the conventional one. Through the contact of annular flange 33 on the top edge of pivotal shaft socket 3 with the bottom edge of pivotal supporting arm 4 can obviously decrease the contact area between said annular flange 33 and said bottom edge during rotation so as to lower the rotary frictional resistance therebetween. The spring of the positioning column, absorbs the elastic force of vibration and improves the smooth, stable and comfortable movement of the handcart.

I claim:

1. A rotary roller set directional control device comprising:
   a roller seat having a front end and a rear end, said front end having a vertical slot therein;
   a pivotal shaft socket, having a top end, said socket being disposed in said vertical slot, said socket having a T-shaped projection at said top end, said projection having a top surface and two opposite vertical slots therein;
   a pair of rollers disposed on said rear end of said roller seat;
   a pivotal supporting arm, having a front end, a middle portion and a rear end, said pivotal supporting arm having a revolving shaft extending vertically from said middle portion, said revolving shaft fitting within said pivotal shaft socket;
   a U-shaped rocker having a base portion, and a front end with a lower edge, said rocker being disposed so that said base portion surrounds said front end of said pivotal supporting arm and said rocker is vertically movable with respect to said pivotal supporting arm, said rocker having an inward catch key on said lower edge of said front end of said rocker, said catch key being disposed to swing vertically downward and lock into either vertical slot of said T-shaped projection.

2. A rotary roller set as in claim 1 further comprising an annular flange being disposed on said top surface of said T-shaped projection, said flange disposed so as to decrease the contact between said T-shaped projection and said pivotal supporting arm.

3. A rotary roller set as in claim 2 wherein said roller seat includes:
   a vertical oval shaft hole disposed at said rear end of said roller seat;
   a positioning column having an aperture therethrough and a clip shaft column disposed on said upper portion thereof, said positioning column being disposed within said vertical oval shaft hole;
   a rear shaft bolt disposed within said oval shaft hole and within said aperture in said positioning column; and
   a spring disposed on said clip shaft column.

* * * * *